United States Patent
Haseli

(10) Patent No.: US 10,167,428 B2
(45) Date of Patent: Jan. 1, 2019

(54) METHODS FOR BIOMASS TORREFACTION WITH CARBON DIOXIDE CAPTURE

(71) Applicant: Central Michigan University, Mount Pleasant, MI (US)

(72) Inventor: Yousef Haseli, Mount Pleasant, MI (US)

(73) Assignee: CENTRAL MICHIGAN UNIVERSITY, Mount Pleasant, MI (US)

( * ) Notice: Subject to any disclaimer, the term of this patent is extended or adjusted under 35 U.S.C. 154(b) by 267 days.

(21) Appl. No.: 15/168,165

(22) Filed: May 30, 2016

(65) Prior Publication Data

US 2016/0348006 A1    Dec. 1, 2016

Related U.S. Application Data

(60) Provisional application No. 62/168,935, filed on Jun. 1, 2015.

(51) Int. Cl.
| | |
|---|---|
| *C07C 1/00* | (2006.01) |
| *C10B 57/14* | (2006.01) |
| *C10B 57/10* | (2006.01) |
| *C10B 53/02* | (2006.01) |
| *C10B 49/02* | (2006.01) |
| *C10L 5/44* | (2006.01) |
| *C10L 9/08* | (2006.01) |

(Continued)

(52) U.S. Cl.
CPC ............. *C10B 57/14* (2013.01); *C10B 49/02* (2013.01); *C10B 53/02* (2013.01); *C10B 57/10* (2013.01); *C10L 5/40* (2013.01); *C10L 5/447* (2013.01); *C10L 9/083* (2013.01); *F23G 5/006* (2013.01); *F23G 5/02* (2013.01); *C10L 2290/02* (2013.01); *C10L 2290/06* (2013.01); *C10L 2290/08* (2013.01); *C10L 2290/10* (2013.01); *C10L 2290/54* (2013.01); *Y02E 50/10* (2013.01); *Y02E 50/14* (2013.01); *Y02E 50/15* (2013.01); *Y02E 50/30* (2013.01)

(58) Field of Classification Search
USPC ................ 585/240, 242; 44/605; 201/25, 21
See application file for complete search history.

(56) References Cited

U.S. PATENT DOCUMENTS

| | | | | |
|---|---|---|---|---|
| 4,553,978 | A | * | 11/1985 | Yvan ....................... C10B 53/02 201/2.5 |
| 4,787,917 | A | * | 11/1988 | Leclerc de Bussy ....................... A01G 23/093 44/590 |

(Continued)

FOREIGN PATENT DOCUMENTS

| | | | |
|---|---|---|---|
| EP | 2543717 | * | 1/2013 |
| EP | 2806016 | * | 11/2014 |

(Continued)

*Primary Examiner* — Nina Bhat
(74) *Attorney, Agent, or Firm* — Michael Best & Friedrich LLP

(57) ABSTRACT

An environmental friendly, continuous biomass torrefaction system is disclosed herein. This torrefaction system captures carbon dioxide ($CO_2$) from the combustion gases generated in the process. A portion of the captured $CO_2$ is recycled and used as the inert gas for torrefying biomass and cooling the torrefied biomass. The rest of the captured $CO_2$ is stored.

9 Claims, 2 Drawing Sheets

(51) Int. Cl.
  *F23G 5/00*    (2006.01)
  *F23G 5/02*    (2006.01)
  *C10L 5/40*    (2006.01)

(56) References Cited

U.S. PATENT DOCUMENTS

| | | | | |
|---|---|---|---|---|
| 8,549,769 | B2* | 10/2013 | Weisselberg | C10L 9/083 110/218 |
| 8,979,952 | B2* | 3/2015 | Raiko | C10B 49/02 44/550 |
| 9,096,800 | B2* | 8/2015 | Shu | C10L 5/44 |
| 9,580,665 | B2* | 2/2017 | Olofsson | F26B 23/022 |
| 2009/0084029 | A1* | 4/2009 | Bergman | C10B 53/02 44/605 |
| 2010/0242351 | A1* | 9/2010 | Causer | C10B 49/02 44/505 |
| 2012/0085023 | A1* | 4/2012 | Teal | C10B 1/10 44/605 |
| 2014/0202073 | A1* | 7/2014 | Leonhardt | C10B 49/02 44/606 |

FOREIGN PATENT DOCUMENTS

WO  WO2010132970 A1 * 11/2010
WO  WO 2012 074388    *  6/2012

* cited by examiner

METHODS FOR BIOMASS TORREFACTION WITH CARBON DIOXIDE CAPTURE

TECHNICAL FIELD

The present disclosure generally relates to biomass torrefaction processes, and in particular to environmental friendly biomass torrefaction processes that use carbon dioxide ($CO_2$) as an inert gas in combination with $CO_2$ capturing and recycling.

BACKGROUND

This section introduces aspects that may help facilitate a better understanding of the disclosure. Accordingly, these statements are to be read in this light and are not to be understood as admissions about what is or is not prior art.

Torrefaction is a pretreatment of biomass at a temperature between 200° C. and 300° C. in the absence of oxygen. The process requires an input heat and a non-oxidizing gas blown through the torrefaction reactor. In the current known torrefaction technologies, either a portion of the gases released during the biomass torrefaction, or the combustion gases are used as the inert gas. The volatiles are partially or entirely burnt in a combustor with additional fuel such as natural gas to provide the heat requirement of the process. The flue gases containing a significant fraction of carbon dioxide ($CO_2$) are discharged to the atmosphere, thereby polluting the environment.

Carbon dioxide is one of the major factors that contribute to the global climate changes. Efforts to reduce the generation and release of $CO_2$ will help to control the current global warming trend and offer environmental benefits.

DETAILED DESCRIPTION

Figure 1:
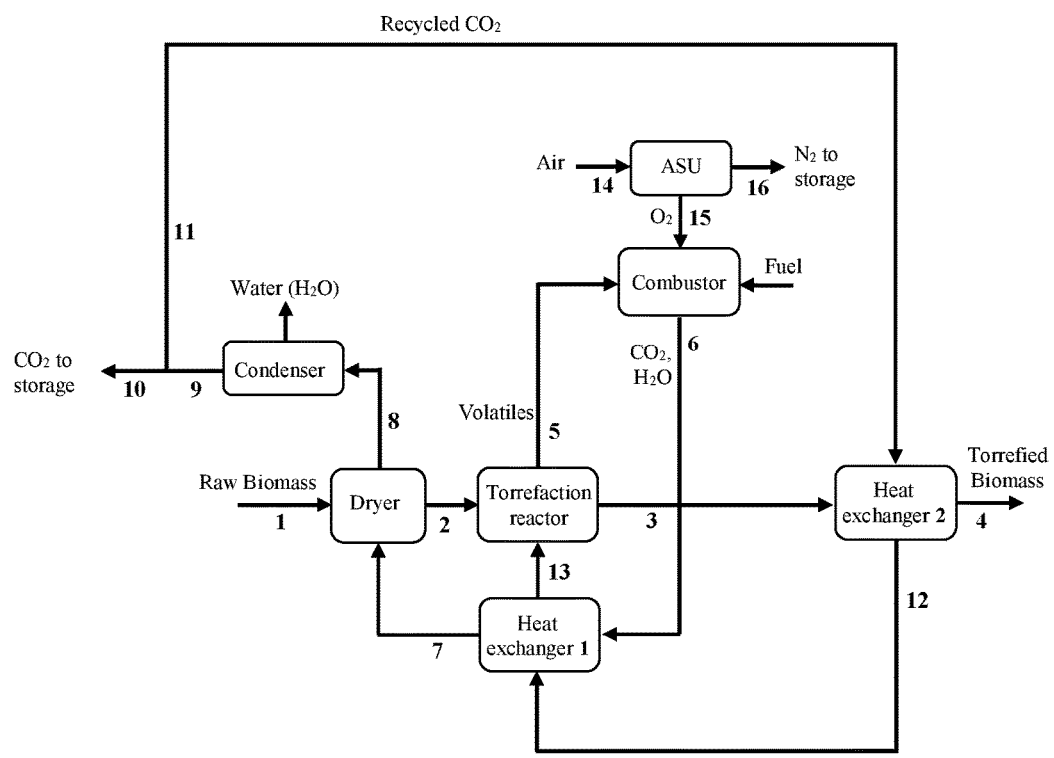
FIG. 1 shows the general steps and components of the torrefaction processes disclosed herein.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In one embodiment, this invention pertains a torrefying process, the process comprising
  a) Preheating raw biomass in a dryer;
  b) Torrefying the preheated biomass in a torrefaction reactor, wherein volatiles so generated are routed to a combustor and torrefied biomass is cooled down in a heat exchanger wherein recycled carbon dioxide ($CO_2$) is heated up before it is transmitted to said torrefaction reactor;
  c) Burning said volatiles from step b together with added fuel in said combustor to provide heat for said torrefaction process, wherein the combustion gases (mainly carbon dioxide and water) are routed to said dryer through a heat exchanger; and
  d) Cooling said combustion gases coming out of said dryer in a condenser, wherein water is condensed and disposed, and part of cooled $CO_2$ is captured and stored, and part of cooled $CO_2$ is recycled and used as an inert gas for torrefying biomass in said torrefaction reactor.

In another embodiment, this invention pertains to a torrefaction process wherein the process compromises recovering of heat by introducing the cool recycled portion of captured $CO_2$ into a heat exchanger for cooling the torrefied biomass coming out of the torrefaction reactor, wherein the $CO_2$ gas is heated up.

In another embodiment, this invention pertains to a torrefaction process wherein the process compromises further heating the recycled portion of captured $CO_2$ before it is sent to the torrefaction reactor, to a desired temperature in a heat exchanger, wherein heat is transferred from the combustion gases coming out of the combustor to the recycled $CO_2$ gas.

In another embodiment, this invention pertains to a torrefaction process, wherein nitrogen is removed from air using an air separation unit (ASU), to provide oxygen source for combustion in said combustor in order to reduce the environmental impacts of said biomass torrefaction processes.

In another embodiment, this invention pertains to a torrefaction process, wherein the process includes introducing hot $CO_2$ gas into the torrefaction reactor for supplying heat to the torrefaction reactor, where the hot $CO_2$ gas directly contacts the preheated biomass.

In another embodiment, this invention pertains to a torrefaction process, wherein burning of the volatiles and added fuel in said combustor is supported by oxygen from an air separation unit (ASU) wherein nitrogen is removed from air to reduce environmental impacts.

In another embodiment, this invention pertains to a torrefaction process wherein nitrogen produced in said air separation unit is stored.

Yet in another embodiment, this invention pertains to a torrefaction process for biomass, the process comprising
  a) Preheating raw biomass in a dryer;
  b) Torrefying the preheated biomass in a torrefaction reactor, wherein volatiles so generated are routed to a combustor and torrefied biomass is cooled down in a heat exchanger wherein recycled carbon dioxide ($CO_2$) is heated up before it is transmitted to said torrefaction reactor;
  c) Burning said volatiles from step b together with added fuel in said combustor to provide heat for said torrefaction process, wherein the combustion gases (mainly carbon dioxide, nitrogen, nitrogen oxides ($NO_x$), and water) are routed to said dryer through a heat exchanger; and
  d) Separating $CO_2$ from said combustion gases coming out of said dryer in a $CO_2$ separation unit, wherein part of $CO_2$ is captured and stored, and part of $CO_2$ is recycled and used as an inert gas for torrefying biomass in said torrefaction reactor.

In another embodiment, this invention pertains to a torrefaction process wherein the process compromises introducing hot $CO_2$ gas into the torrefaction reactor for supplying heat to the torrefaction reactor, where the hot $CO_2$ gas directly contacts the preheated biomass.

In another embodiment, this invention pertains to a torrefaction process wherein air is used to provide oxygen source for burning in said combustor.

In another embodiment, this invention pertains to a torrefaction process wherein a $CO_2$ separation unit comprises a chemical absorption process, or a physical absorption process, or a membrane process, or a hybrid membrane/absorption processes.

In another embodiment, this invention pertains a torrefaction process wherein the dryer and the torrefaction reactor are integrated into one single unit.

In another embodiment, this invention pertains to a torrefied biomass product using the processes disclosed herein.

Conventional torrefaction systems emit combustion gases, notably carbon dioxide ($CO_2$), to the environment. To resolve this problem, the inventor has proposed torrefaction systems and methods which allow for capturing $CO_2$ from the combustion gases and recycling a portion of the captured $CO_2$ that is used as the inert gas. An exemplary embodiment of the invention is schematically shown in FIG. 1 which comprises a dryer/preheater, a torrefaction reactor, a combustor, an air separation unit (ASU), two heat exchangers, and a condenser. The inert gas used in the torrefaction reactor is carbon dioxide which is captured from the combustion gases and recycled to the system.

Raw biomass naturally contains a significant amount of moisture. The first step for torrefying biomass is to remove the moisture content of the biomass preferably in a dryer located upstream of the torrefaction reactor. In some embodiments, the dryer and the torrefaction reactor may be integrated into one single unit so that drying process takes place within the torrefaction reactor.

With reference to FIG. 1, raw biomass (denoted by 1) is admitted to the dryer where it undergoes a preheating process up to a temperature around 120-150° C. The thermal energy required in the dryer for preheating the biomass is supplied directly from the combustion gases (denoted by 7) which enter the dryer and flow over the biomass. The direct contact between the combustion gases and the biomass in the dryer allows for an efficient heat transfer. The configuration of the dryer is preferably a vertical column which admits biomass from the top and the combustion gases are blown from the bottom. Depending on the application, other configurations may be used for the dryer.

The dried biomass, preferably with moisture content below 2%, exits the dryer (denoted by 2) and it is fed to the torrefaction reactor. The combustion gases leave the dryer (denoted by 8) which are sent to the condenser. The moisture removed from the biomass in the dryer also leaves the dryer in vapor phase (i.e., steam) with the combustion gases (denoted by 8).

The preheated or at least partially dried biomass (denoted by 2) is sent to the torrefaction reactor where it undergoes a mild pyrolysis process thereby losing some of its mass. The inert gas used in the torrefaction reactor is a hot flow of carbon dioxide (denoted by 13) coming from the heat exchanger 1 (HE1). The thermal energy required for torrefying the biomass in the torrefaction reactor is provided with the hot flow of $CO_2$ (represented by 13), maintaining a temperature preferably between 200 and 300° C. throughout the reactor. This flow of $CO_2$ is a recycled portion of the captured $CO_2$ (represented by 9). One preferable configuration of the torrefaction reactor is a vertical counter-flow column in that the biomass and the $CO_2$ (used as the inert gas) move in opposite direction within the torrefaction reactor.

Within the torrefaction reactor, the dried/preheated biomass contacts the hot flow of $CO_2$. The biomass then losses a fraction of its mass/weight as the volatiles evolve. The torrefying gas and the volatiles leave the torrefaction reactor as a single flow (denoted by 5). The torrefied biomass exits the torrefaction reactor (denoted by 3) and it is sent to the heat exchanger 2 (HE2) where it undergoes a cooling process using the recycled flow of $CO_2$ (denoted by 11).

The volatiles released during the torrefaction process may include several components such as CO (carbon monoxide), $H_2$ (hydrogen), $CH_4$ (methane), etc. The mixture of the volatiles and the $CO_2$ leaving the torrefaction reactor is fed to the combustor. The combustible components of the volatiles (e.g., CO, $H_2$, etc.) as well as the fuel (such as natural gas) separately introduced to the combustor burn within the combustor with oxidizing gas being oxygen that is fed to the combustor from the air separation unit (ASU). In contrast, in the conventional torrefaction systems, air is used in the combustor as the oxidizing gas. Using air (which includes a significant fraction of nitrogen) in a combustion process leads to formation of $NO_x$ (nitrogen oxides). The ASU receives the air (denoted by 14) and it splits the air into oxygen (denoted by 15) and nitrogen (denoted by 16). Various methods are currently used for air separation. The ASU may, for example, utilize cryogenic distillation. Other alternative methods for producing oxygen from air include pressure swing adsorption (PSA), vacuum pressure swing adsorption (VPSA), and membrane. The oxygen produced in the ASU (denoted by 15) is fed to the combustor. The nitrogen leaving the ASU (denoted by 16) is sent for compression and storage.

The byproducts of the combustion reactions in the combustor are carbon dioxide ($CO_2$) and steam ($H_2O$). In other words, the fuel and the volatiles undergo a complete combustion process within the combustor yielding combustion gases comprising $CO_2$ and $H_2O$. The hot combustion gases leaving the combustor (denoted by 6) are sent to HE1 to heat up the recycled flow of $CO_2$ and to increase its temperature up to a desired level suitable for torrefaction process. HE1 is a gas-to-gas heat exchanger; that is, it allows for transferring a portion of the thermal energy of the hot combustion gases to the recycled $CO_2$ without mixing the streams of the hot flow (i.e., combustion gases) and the cool flow (i.e., recycled $CO_2$). The recycled $CO_2$ leaving the HE2 is fed to HE1 where its temperature rises due to the heat exchange with the combustion gases (denoted by 6) coming from the combustor. The heated $CO_2$ flow then exits HE1 (denoted by 13) at a temperature suitable for torrefying the biomass in the torrefaction reactor.

The combustion gases leaving HE1 (denoted by 7) are then introduced to the dryer. The raw biomass (denoted by 1) is fed to the dryer where it contacts the incoming combustion gases (denoted by 7), which provide the thermal energy necessary for preheating the biomass and removing its moisture content. The preheated or at least partially dried biomass exits the dryer (denoted by 2) which is then admitted to the torrefaction reactor. The combustion gases containing the moisture removed from the biomass within the dryer leave the dryer (denoted by 8), which are then passed through the condenser.

The flow of combustion gases leaving the dryer (denoted by 8) is a mixture of carbon dioxide and steam. The condenser is used for condensation of steam from the combustion gases. The condenser therefore allows for splitting the combustion gases into carbon dioxide and water. The condensate/water ($H_2O$) is collected and drained from the condenser and it is sent for waste water treatment. The cool carbon dioxide leaves the condenser (denoted by 9) in a gaseous state as its boiling temperature is much lower than that of water. A portion of the carbon dioxide leaving the condenser (denoted by 9) is recycled back (dented by 11) and sent to HE2. The rest of the carbon dioxide (denoted by 10) is sent for compression and storage.

With further reference to FIG. 1, the hot torrefied biomass (denoted by 3) undergoes a cooling process within HE2. The cool recycled CO$_2$ (denoted by 11) is introduced to HE2 where it directly contacts the hot torrefied biomass whose temperature is around that of the torrefaction reactor (i.e., 200-300° C.). The temperature of the CO$_2$ leaving the condenser (denoted by 9) is much lower than that of the hot torrefied biomass (denoted by 3) since the combustion gases are cooled within the condenser so the temperature of the combustion gases drops well below the boiling temperature of water. HE2 allows for recovering the thermal energy of the hot torrefied biomass (denoted by 3) and preheating the recycled flow of CO$_2$ before it is heated in HE1. The cooled torrefied biomass (denoted by 4) leaves HE2 which may then be sent for further processing; e.g., secondary cooling, grinding, pelletizing, etc. The heated flow of CO$_2$ (denoted by 12) exits HE2 and is sent to HE1.

Figure 2:
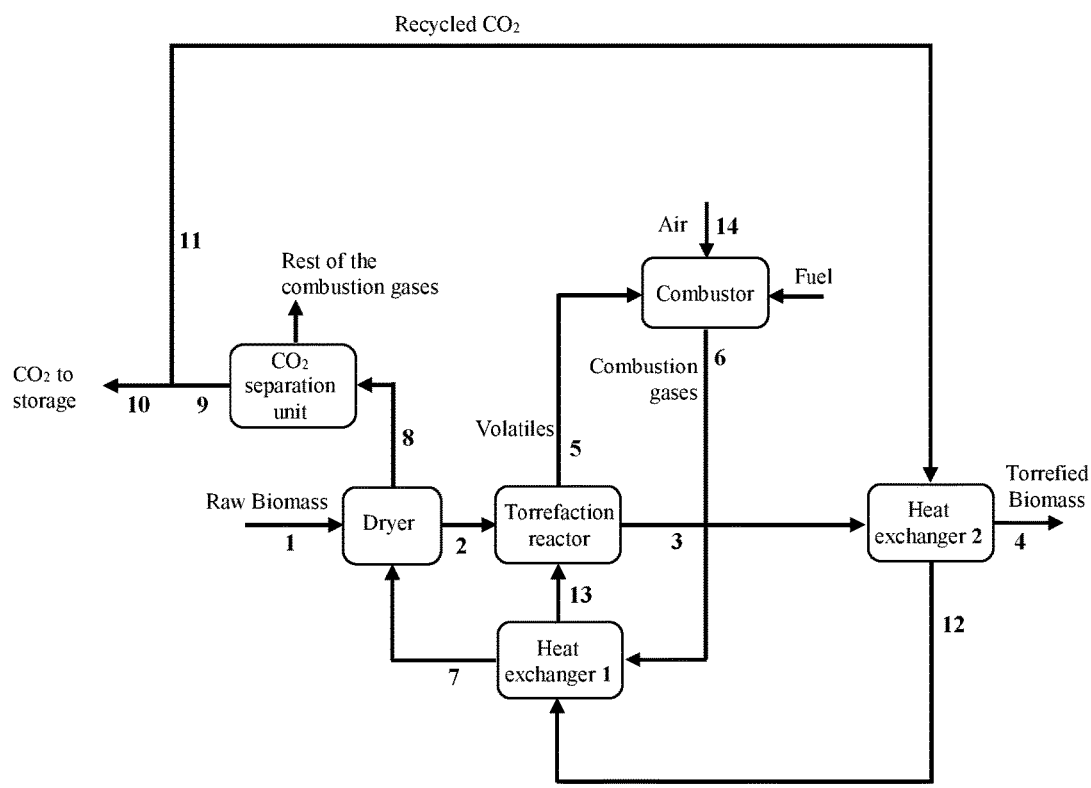
FIG. 2 is an alternative setup of the steps and components of the torrefaction processes disclosed herein.

An alternative exemplary embodiment for biomass torrefaction with CO$_2$ capture and using a portion of the captured CO$_2$ as the inert gas is depicted in FIG. 2 which comprises a dryer/preheater, a torrefaction reactor, a combustor, two heat exchangers, and a CO$_2$ separation unit. The operation of the torrefaction system shown in FIG. 2 is in many aspects similar to that of the torrefaction system depicted in FIG. 1, with the following main differences.

1) The torrefaction system shown in FIG. 2 does not require an ASU (air separation unit) and a condenser, but it uses a CO$_2$ separation unit located downstream of the dryer.
2) In the system of FIG. 2, the oxidizing agent required for combusting the fuel and the combustible components of the volatiles released during the biomass torrefaction is air (not oxygen as in the system of FIG. 1).
3) The byproducts of the combustion reactions leaving the combustor (denoted by 6) contain nitrogen and nitric oxides (NO$_x$) in addition to carbon dioxide and steam.

With reference to FIG. 2, the combustion gases leaving the dryer (denoted by 8) are introduced to the CO$_2$ separation unit, which may utilize, for example, chemical absorption to separate CO$_2$ from the combustion gases. Other technologies such as physical absorption, membrane or hybrid membrane/amine processes may alternatively be utilized for separating the CO$_2$ from the combustion gases within the CO$_2$ separation unit in the system of FIG. 2. The separated CO$_2$ (denoted by 9) is split into two streams downstream of the CO$_2$ separation unit. A portion of the captured CO$_2$ is recycled (denoted by 11) and sent to HE2, and the rest (denoted by 10) is sent for compression and storage.

A comparison of the new methods for biomass torrefaction integrated with carbon dioxide capture (i.e., FIG. 1 and FIG. 2) and the current torrefaction technology is summarized in Table 1.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

REFERENCES

Raiko, March 2015, U.S. Pat. No. 8,979,952 B2
Bergman, April 2009, US2009/0084029 A1
Teal et al., April 2012, US2012/0085023 A1
Shu et al., February 2012, WO2012/016149 A1
De Wit et al., June 2012, WO2012/074388 A1
Olofsson et al., November 2012, WO2012/158118 A1
Franciszek, et al., January 2013, EP 2543 717A1
Lechoslaw et al., November 2014, EP 2806 016 A1

What is claimed is:
1. A torrefaction process for biomass, the process comprising:
preheating raw biomass in a dryer, thereby generating preheated raw biomass;
torrefying the preheated raw biomass in a torrefaction reactor, wherein the torrefaction reactor is configured to receive a heated carbon dioxide (CO$_2$) stream;
providing volatiles from the torrefaction reactor to a combustor;
providing torrefied biomass from the torrefaction reactor to a first heat exchanger, the first heat exchanger configured to receive recycled carbon dioxide (CO$_2$);
cooling the torrefied biomass in the first heat exchanger, including contacting the torrefied biomass with the recycled carbon dioxide (CO$_2$), thereby heating the recycled carbon dioxide (CO$_2$);
combusting the volatiles in the combustor, thereby generating a combustion outlet steam including carbon dioxide (CO$_2$) and water (H$_2$O);
providing the combustion outlet stream to a second heat exchanger;
providing the recycled carbon dioxide (CO$_2$) from the first heat exchanger to the second heat exchanger;
in the second heat exchanger, heating the recycled carbon dioxide (CO$_2$) with the combustion outlet stream,

TABLE 1

| Item | Method 1 | Method 2 | Existing Technology |
| --- | --- | --- | --- |
| Torrefying Gas | CO$_2$ | CO$_2$ | Volatiles/combustion gases |
| Oxidizing gas | Oxygen | Air | Air |
| Combustion Gases | CO$_2$, H$_2$O | CO$_2$, N$_2$, H$_2$O, NO$_x$ | CO$_2$, N$_2$, H$_2$O, NO$_x$ |
| CO$_2$ separation unit | No | Yes | No |
| Air Separation Unit | Yes | No | No |
| Condenser | Yes | No | No |
| CO$_2$ storage | Yes | Yes | No |
| Nitrogen storage | Yes | No | No |
| Fuel fed to the combustor | Hydrogen, Syngas (CO + H$_2$) or Hydrocarbon; e.g. CH$_4$ | Hydrogen, Syngas (CO + H$_2$) or Hydrocarbon; e.g. CH$_4$ | e.g. Natural gas | thereby generating the heated carbon dioxide ($CO_2$) stream and a reduced temperature combustion outlet stream;

providing the reduced temperature combustion outlet stream to the dryer;

providing a dryer gas outlet stream to a condenser, the dryer gas outlet stream including carbon dioxide ($CO_2$) and water vapor;

cooling the dryer gas outlet stream in the condenser, thereby generating a condensed water stream and a cooled $CO_2$ stream; and providing a portion of the cooled $CO_2$ stream as the recycled carbon dioxide ($CO_2$) to the first heat exchanger.

2. The torrefaction process of claim 1, wherein the heated carbon dioxide ($CO_2$) stream is a heat source for the torrefaction process; and wherein the heated carbon dioxide ($CO_2$) stream directly contacts the preheated raw biomass.

3. The torrefaction process of claim 1, further comprising:

separating nitrogen from air in an air separation unit, thereby generating an oxygen ($O_2$) stream and a nitrogen ($N_2$) stream; and providing the oxygen stream to the combustor.

4. The torrefaction process of claim 3, further comprising providing the nitrogen stream from the air separation unit to storage.

5. The torrefaction process of claim 1, further comprising providing a remainder of the cooled $CO_2$ stream to storage.

6. A torrefaction process for biomass, the process comprising preheating raw biomass in a dryer, thereby generating preheated raw biomass;

torrefying the preheated raw biomass in a torrefaction reactor, wherein the torrefaction reactor is configured to receive a heated carbon dioxide ($CO_2$) stream;

cooling the torrefied biomass in the first heat exchanger, including contacting the torrefied biomass with the recycled carbon dioxide ($CO_2$), thereby heating the recycled carbon dioxide ($CO_2$);

combusting the volatiles with fuel in the combustor, thereby generating a combustion outlet steam including carbon dioxide ($CO_2$) nitrogen, nitrogen oxides (NOx) and water ($H_2O$);

providing the combustion outlet stream to a second heat exchanger;

providing the recycled carbon dioxide ($CO_2$) from the first heat exchanger to the second heat exchanger;

in the second heat exchanger, heating the recycled carbon dioxide ($CO_2$) with the combustion outlet stream, thereby generating the heated carbon dioxide ($CO_2$) stream and a reduced temperature combustion outlet stream;

providing the reduced temperature combustion outlet stream to the dryer;

providing a dryer gas outlet stream to a $CO_2$ separation unit, the dryer gas outlet stream including carbon dioxide ($CO_2$), nitrogen, nitrogen oxides (NOx) and water ($H_2O$);

separating the dryer combustion outlet stream in the $CO_2$ separation unit, thereby generating a $CO_2$ outlet stream;

providing a portion of the $CO_2$ outlet stream as the recycled carbon dioxide ($CO_2$) to the first heat exchanger; and providing a remainder portion of the $CO_2$ outlet stream to storage.

7. The torrefaction process of claim 6, wherein the heated carbon dioxide stream ($CO_2$) is a heat source for the torrefaction reactor; and wherein the heated carbon dioxide ($CO_2$) stream directly contacts the preheated raw biomass.

8. The torrefaction process of claim 6, further comprising providing an air stream to the combustor, the air stream being used to provide an oxygen source for burning in said combustor.

9. The torrefaction process of claim 6, wherein said $CO_2$ separation takes place by a process selected from the group consisting of: chemical absorption, physical absorption, membrane separation, and hybrid membrane/absorption.

* * * * *